(12) United States Patent
Futatsugi et al.

(10) Patent No.: US 11,586,856 B2
(45) Date of Patent: Feb. 21, 2023

(54) OBJECT RECOGNITION DEVICE, OBJECT RECOGNITION METHOD, AND OBJECT RECOGNITION PROGRAM

(71) Applicant: NEC Corporation, Tokyo (JP)

(72) Inventors: Yasunori Futatsugi, Tokyo (JP); Yoshihiro Mishima, Tokyo (JP); Atsushi Fukuzato, Tokyo (JP); Jun Nakayamada, Tokyo (JP); Kenji Sobata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/287,182

(22) PCT Filed: Sep. 13, 2019

(86) PCT No.: PCT/JP2019/036152
§ 371 (c)(1),
(2) Date: Apr. 21, 2021

(87) PCT Pub. No.: WO2020/090251
PCT Pub. Date: May 7, 2020

(65) Prior Publication Data
US 2021/0390353 A1    Dec. 16, 2021

(30) Foreign Application Priority Data

Oct. 30, 2018 (JP) .............................. JP2018-203943

(51) Int. Cl.
*G06K 9/62* (2022.01)
*G06V 20/58* (2022.01)
(Continued)

(52) U.S. Cl.
CPC ............ *G06K 9/6265* (2013.01); *G01S 7/417* (2013.01); *G01S 13/931* (2013.01); *G01S 17/931* (2020.01);
(Continued)

(58) Field of Classification Search
None
See application file for complete search history.

(56) References Cited

U.S. PATENT DOCUMENTS

| 2013/0235201 A1 | 9/2013 | Kiyohara et al. |
| 2015/0186733 A1* | 7/2015 | Hayakawa ............ G06V 10/40 382/103 |
| 2018/0137336 A1 | 5/2018 | Shoda et al. |

(Continued)

FOREIGN PATENT DOCUMENTS

| JP | 2001-153969 A | 6/2001 |
| JP | 2010-204095 A | 9/2010 |

(Continued)

OTHER PUBLICATIONS

Li X, Ye M, Liu Y, Zhu C. Adaptive deep convolutional neural networks for scene-specific object detection. IEEE Transactions on Circuits and Systems for Video Technology. Sep. 7, 2017;29(9):2538-51. (Year: 2017).*

(Continued)

*Primary Examiner* — Emily C Terrell
*Assistant Examiner* — Nathan J Bloom
(74) *Attorney, Agent, or Firm* — Sughrue Mion, PLLC

(57) ABSTRACT

An object recognition device 80 includes a scene determination unit 81, a learning-model selection unit 82, and an object recognition unit 83. The scene determination unit 81 determines, based on information obtained during driving of a vehicle, a scene of the vehicle. The learning-model selection unit 82 selects, in accordance with the determined scene, a learning model to be used for object recognition from two or more learning models. The object recognition unit 83 recognizes, using the selected learning model, an object in an image to be photographed during driving of the vehicle.

16 Claims, 13 Drawing Sheets

(51) Int. Cl.
*G01S 7/41* (2006.01)
*G01S 13/931* (2020.01)
*G06V 10/774* (2022.01)
*G01S 17/931* (2020.01)
*G06V 10/778* (2022.01)
*G06N 20/20* (2019.01)
*G06N 3/04* (2006.01)

(52) U.S. Cl.
CPC ......... *G06K 9/6227* (2013.01); *G06K 9/6257* (2013.01); *G06V 10/7747* (2022.01); *G06V 10/7796* (2022.01); *G06V 20/58* (2022.01); *G06V 20/584* (2022.01); *G06N 3/0454* (2013.01); *G06N 20/20* (2019.01); *G06V 2201/08* (2022.01)

(56) References Cited

U.S. PATENT DOCUMENTS

| | | | |
|---|---|---|---|
| 2018/0357484 A1* | 12/2018 | Omata | G08G 1/167 |
| 2019/0122378 A1* | 4/2019 | Aswin | G06V 10/462 |
| 2020/0014761 A1 | 1/2020 | Kawaai et al. | |

FOREIGN PATENT DOCUMENTS

| | | | | |
|---|---|---|---|---|
| JP | 2013-186668 A | | 9/2013 | |
| JP | 2017-068351 A | | 4/2017 | |
| JP | 2017068351 A | * | 4/2017 | |
| JP | 2017-116506 A | | 6/2017 | |
| JP | 2018-041209 A | | 3/2018 | |
| JP | 2018041209 A | * | 3/2018 | |
| JP | 2018-072884 A | | 5/2018 | |
| JP | 2018-073275 A | | 5/2018 | |
| JP | 2018-081404 A | | 5/2018 | |
| JP | 2019-087229 A | | 6/2019 | |
| WO | 2018/173121 A1 | | 9/2018 | |

OTHER PUBLICATIONS

International Search Report for PCT Application No. PCT/JP2019/036152, dated Nov. 26, 2019.

English translation of Written opinion for PCT Application No. PCT/JP2019/036152, dated Nov. 26, 2019.

Japanese Office Action for JP Application No. 2020-554806 dated May 10, 2022 with English Translation.

Japanese Office Action for JP Application No. 2020-554806, dated Nov. 8, 2022 with English Translation.

Yoshikazu Kido et al., "Recognition of Driving Environment by Deep Learning Algorithm using adaptive Environment Model", 32nd Image Encoding Symposium, 22nd Video Media Processing Symposium (PCSJ/IMPS2017)(a collection of lecture papers), and Video Media Processing symposium, Nov. 20. 2017, the Institute of Technical Research and Technology, pp. 196-197.

* cited by examiner

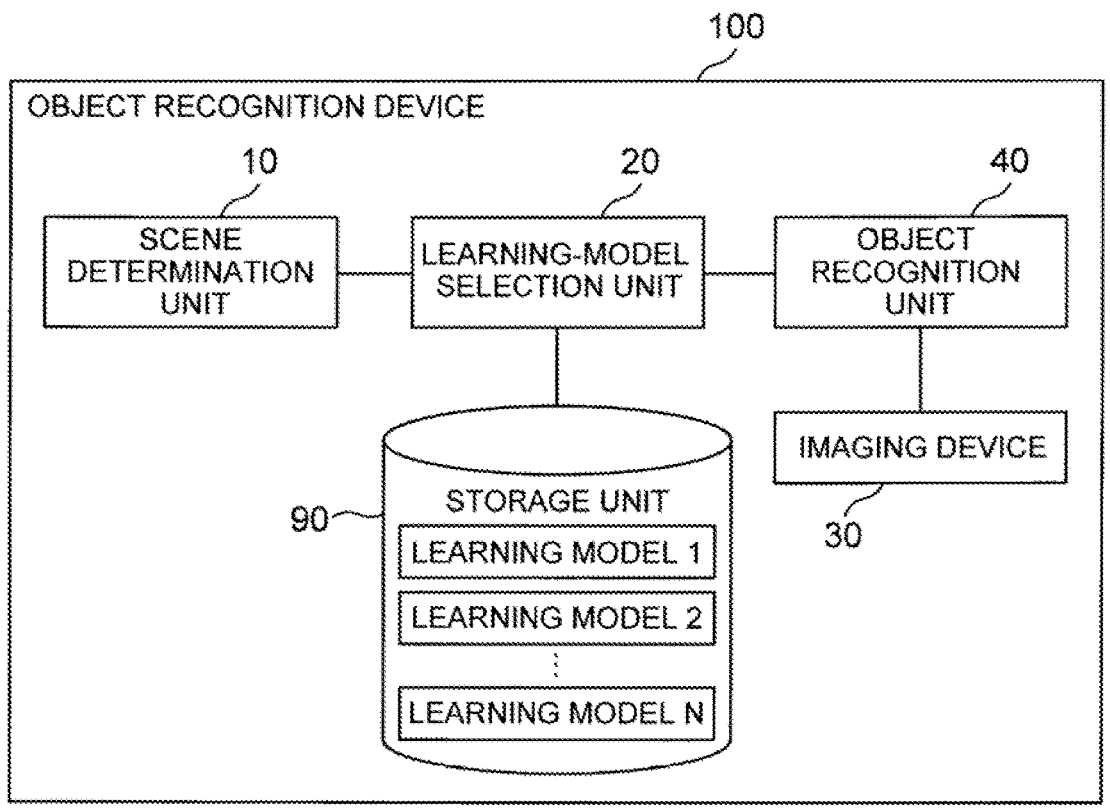

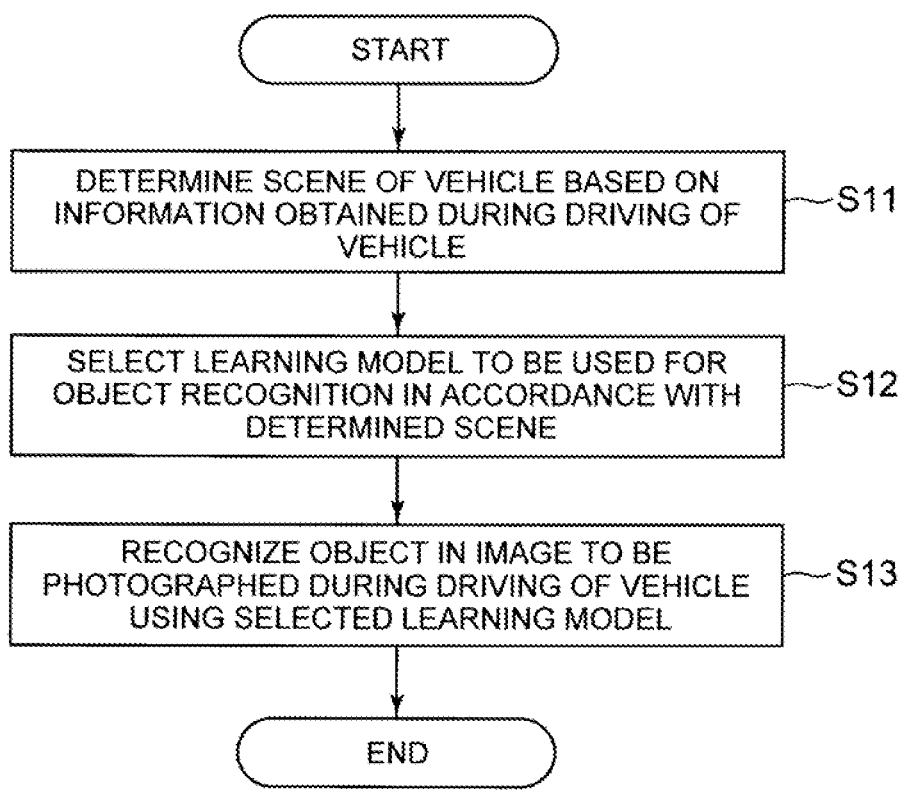

| SCENE DETERMINATION RESULT | BRIGHTNESS/DARKNESS DETERMINATION RESULT | LEARNING MODEL TO BE SELECTED |
|---|---|---|
| URBAN AREA | BRIGHT | LEARNING MODEL 1-1 |
| URBAN AREA | DARK | LEARNING MODEL 1-2 |
| HIGHWAY | BRIGHT | LEARNING MODEL 2-1 |
| HIGHWAY | DARK | LEARNING MODEL 2-2 |
| SHOPPING DISTRICT | BRIGHT | LEARNING MODEL 3-1 |
| SHOPPING DISTRICT | DARK | LEARNING MODEL 3-2 |

| SCENE DETERMINATION RESULT | RAINDROP DETERMINATION RESULT | LEARNING MODEL TO BE SELECTED |
|---|---|---|
| URBAN AREA | FINE | LEARNING MODEL 1-1 |
| | RAINING | LEARNING MODEL 1-2 |
| HIGHWAY | FINE | LEARNING MODEL 2-1 |
| | RAINING | LEARNING MODEL 2-2 |
| SHOPPING DISTRICT | FINE | LEARNING MODEL 3-1 |
| | RAINING | LEARNING MODEL 3-2 |

| SCENE DETERMINATION CATEGORY | SCENE DETERMINATION RESULT SCORE | PRIORITY ORDER |
|---|---|---|
| SHOPPING DISTRICT | 0.9 | 1 |
| SUBURBAN AREA | 0.7 | 2 |
| HIGHWAY | 0.2 | 3 |

OBJECT RECOGNITION DEVICE, OBJECT RECOGNITION METHOD, AND OBJECT RECOGNITION PROGRAM

This application is a National Stage Entry of PCT/JP2019/036152 filed on Sep. 13, 2019, which claims priority from Japanese Patent Application 2018-203943 filed on Oct. 30, 2018, the contents of all of which are incorporated herein by reference, in their entirety.

TECHNICAL FIELD

The present invention relates to an object recognition device, an object recognition method, and an object recognition program that recognize an object to be photographed during driving.

BACKGROUND ART

In recent years, autonomous driving techniques for automating manned driving and hazard prediction techniques for predicting a hazard during driving have attracted attention. In order to perform autonomous driving and hazard prediction, various methods for recognizing an object by photographing images of the outside of a vehicle have been proposed.

For example, PTL 1 discloses an image recognition device that recognizes information required for driving assistance and autonomous driving while reducing the calculation load. The device disclosed in PTL 1 detects, based on three-dimensional map data in which position information on a stationary object outside a vehicle is set and on the relative position and distance between the vehicle and the stationary object, the stationary object as a subject for image recognition processing, and performs the image recognition process by narrowing the range including the detected subject.

CITATION LIST

Patent Literature

PTL 1: Japanese Patent Application Laid-Open No. 2018-73275

SUMMARY OF INVENTION

Technical Problem

In autonomous driving, it is required to consider not only stationary objects but also moving objects, such as bicycles, pedestrians, and two-wheeled vehicles. However, the image recognition device disclosed in PTL 1 detects a stationary object as a subject for recognition, and it is difficult to detect a moving object as a subject for image recognition processing. On the other hand, if it is attempted to uniformly recognize all the objects to be photographed, it is difficult to improve the recognition accuracy of each object, and the processing speed can decrease as a result of increasing the calculation load. Thus, it is preferable that the calculation load is reduced while the recognition accuracy of an object in an image to be photographed during driving is improved.

For the above reason, a purpose of the present invention is to provide an object recognition device, an object recognition method, and an object recognition program that can improve the recognition accuracy of an object to be photographed during driving while reducing the calculation load.

Solution to Problem

An object recognition device according to the present invention includes a scene determination unit that determines, based on information obtained during driving of a vehicle, a scene of the vehicle, a learning-model selection unit that selects, in accordance with the determined scene, a learning model to be used for object recognition from two or more learning models, and an object recognition unit that recognizes, using the selected learning model, an object in an image to be photographed during driving of the vehicle.

An object recognition method according to the present invention includes determining, by a computer, a scene of a vehicle based on information obtained during driving of the vehicle, selecting, by the computer, a learning model to be used for object recognition from two or more learning models in accordance with the determined scene, and recognizing, by the computer, an object in an image to be photographed during driving of the vehicle using the selected learning model.

An object recognition program according to the present invention, the program causes a computer to execute: scene determination processing for determining a scene of a vehicle based on information obtained during driving of the vehicle, learning model selection processing for selecting a learning model to be used for object recognition from two or more learning models in accordance with the determined scene, and object recognition processing for recognizing an object in an image to be photographed during driving of the vehicle using the selected learning model.

Advantageous Effects of Invention

According to the present invention, it is possible to improve the recognition accuracy of an object to be photographed during driving while the calculation load is reduced.

BRIEF DESCRIPTION OF DRAWINGS

FIG. 1 It depicts a block diagram showing a configuration example of an object recognition device in a first exemplary embodiment of the present invention.

FIG. 2 It depicts an explanatory diagram showing an example of a learning model defined for each scene.

FIG. 3 It depicts a flowchart showing an operation example of the object recognition device in the first exemplary embodiment.

DESCRIPTION OF EMBODIMENTS

Figure 4:
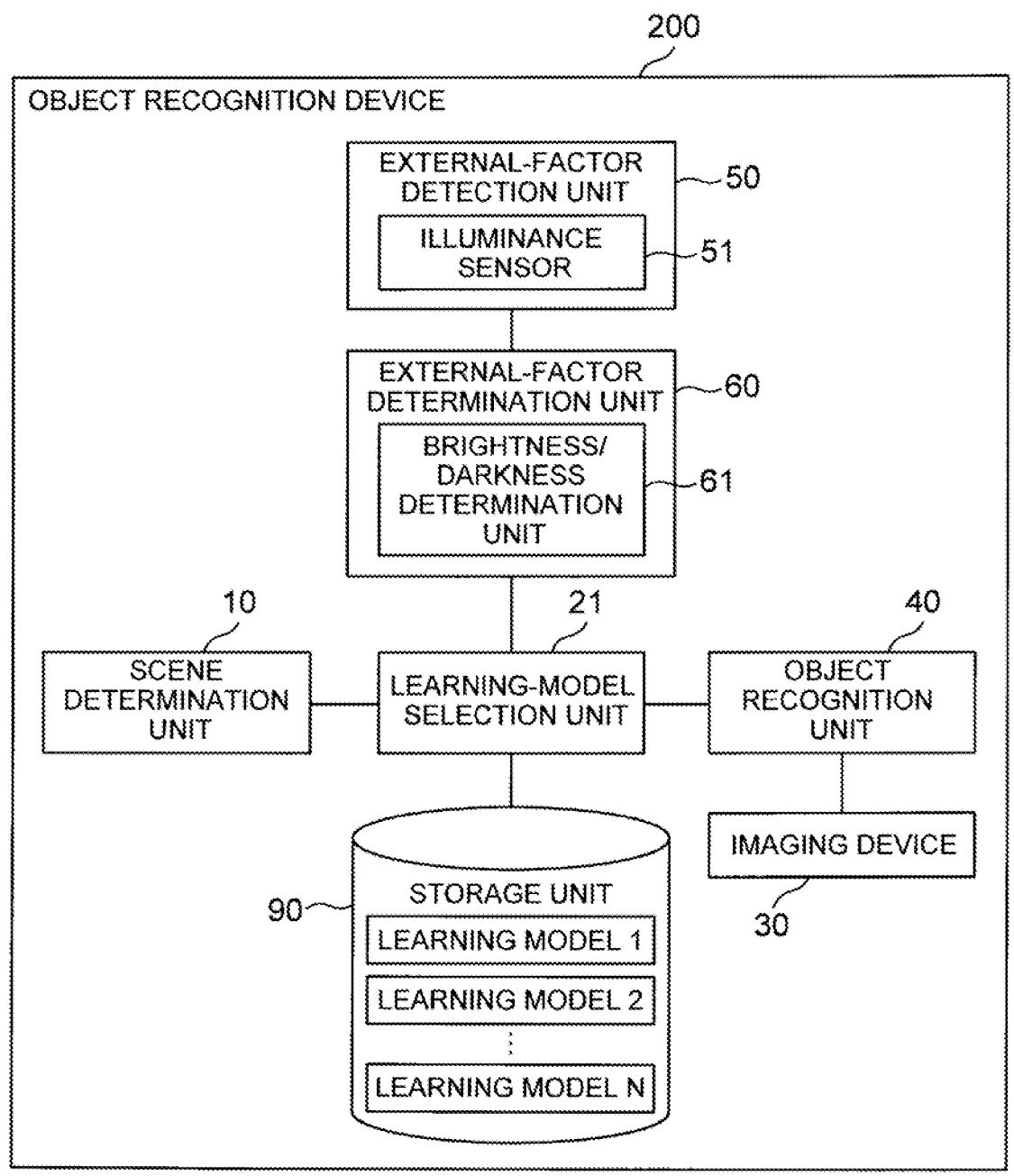
FIG. 4 It depicts a block diagram showing a configuration example of an object recognition device in a second exemplary embodiment of the present invention.

Hereinafter, exemplary embodiments of the present invention will be described with reference to the drawings. An object recognition device according to the present invention is mounted on a vehicle and recognizes, using a learning model, an object in an image to be photographed by an imaging device described later. Each learning model used in the present invention is a model for recognizing what is an object in an image, and the recognition accuracy is different for each object type. For example, it is assumed that learning models with high recognition accuracy are generated in advance for each object type, such as a model with good recognition accuracy for pedestrians, a model with good recognition accuracy for automobiles, and a model with good recognition accuracy for two-wheeled vehicles.

First Exemplary Embodiment

FIG. 1 is a block diagram showing a configuration example of an object recognition device in a first exemplary embodiment of the present invention. An object recognition device 100 in the present exemplary embodiment includes a scene determination unit 10, a learning-model selection unit 20, an imaging device 30, an object recognition unit 40, and a storage unit 90.

The storage unit 90 stores a plurality of learning models used by the object recognition unit 40 described later. The storage unit 90 may further store various types of information required for the object recognition device 100 to operate. The storage unit 90 is implemented by, for example, a magnetic disk or the like.

The scene determination unit 10 receives input of information acquired by various sensors that detect the state of a vehicle. Examples of the sensors that detect the state of the vehicle are a millimeter-wave radar that detects millimeter-wave information, a global positioning system (GPS) that acquires position information, and a laser imaging detection and ranging (LiDAR) that acquires the distance to a subject, and a camera that photographs an image of the surrounding area. In the present exemplary embodiment, an image to be subjected to object recognition is photographed by the imaging device 30 described later. However, the scene determination unit 10 may receive input of an image to be subjected to recognition.

The scene determination unit 10 determines a scene of the vehicle based on information obtained during driving of the vehicle, such as the information input from the various sensors. Here, a scene means an external environment surrounding the vehicle and is, for example, a situation in which the vehicle is traveling (in an urban area, on a highway, in a shopping district, or the like). However, a scene to be determined in the present exemplary embodiment is not limited to an expression that can be interpreted by humans as described above and may be represented by, for example, a feature vector representing an external environment. However, in order for the explanation to be easily understood, the operation of the object recognition device in the present exemplary embodiment will be described with specific scenes in the following description.

The scene determination unit 10 determines a scene by any method. The scene determination unit 10 may determine a scene on a rule basis or may determine a scene using a distinction model for distinguishing the certainty of each scene. For example, the scene determination unit 10 may determine the current traveling location (for example, a highway, a shopping district, or the like) based on map information given in advance and position information acquired by the GPS. In addition, the scene determination unit 10 may hold scene determination models generated in advance based on acquirable sensor information by machine learning to determine a scene based on received sensor information.

The learning-model selection unit 20 selects, in accordance with the determined scene, a learning model to be used for object recognition from two or more learning models. For example, a learning model to be selected for each scene may be defined in advance in accordance with the characteristic of the learning model, and the learning-model selection unit 20 may select a learning model corresponding to the determined scene. The mode of the learning models used in the present exemplary embodiment is arbitrary and is, for example, a neural network or the like.

FIG. 2 is an explanatory diagram showing an example of a learning model defined for each scene. In the example shown in FIG. 2, "an urban area", "a highway", and "a shopping district" are assumed as scenes. Here, it is assumed that a learning model 1 has good recognition accuracy for pedestrians, a learning model 2 has good recognition accuracy for automobiles, and a learning model 3 has good recognition accuracy for two-wheeled vehicles. At this time, the "urban area" and the learning model 1, the "highway" and the learning model 2, and the "shopping district" and the learning model 3 are associated with each other, and the learning-model selection unit 20 is only required to select a learning model corresponding to the scene determined by the scene determination unit 10.

The imaging device 30 photographs an image of the outside of the vehicle during driving of the vehicle. The timing at which the imaging device 30 photographs an image may be any timing during traveling or stopping. The imaging device 30 may photograph an image at predetermined intervals, or may photograph an image in response to an instruction from a driver or the like or a control device. The imaging device 30 is, for example, an in-vehicle camera that photographs a scenery outside the vehicle.

The object recognition unit 40 recognizes an object in an image photographed by the imaging device 30 using the selected learning model. Note that, a method by which the object recognition unit 40 recognizes an object using a learning model is widely known, and detailed description thereof is omitted here.

The scene determination unit 10, the learning-model selection unit 20, and the object recognition unit 40 are implemented by the CPU of a computer that operates according to a program (object recognition program). For example, the program may be stored in the storage unit 90 of the object recognition device 100, and the CPU may load the program and operate as the scene determination unit 10, the learning-model selection unit 20, and the object recognition unit 40 according to the program. In addition, each of the scene determination unit 10, the learning-model selection unit 20, and the object recognition unit 40 may be implemented by dedicated hardware.

Next, the operation of the object recognition device 100 in the present exemplary embodiment will be described. FIG. 3 is an explanatory diagram showing an operation example of the object recognition device 100 in the present exemplary embodiment. The scene determination unit 10 determines a scene of the vehicle based on sensor information and the like obtained during driving of the vehicle (step S11). The learning-model selection unit 20 selects, in accordance with the determined scene, a learning model to be used for object recognition from two or more learning models (step S12). Then, the object recognition unit 40 recognizes, using the selected learning model, an object in an image to be photographed during driving of the vehicle (step S13).

As described above, in the present exemplary embodiment, the scene determination unit 10 determines a scene of the vehicle based on the information obtained during driving of the vehicle, and the learning-model selection unit 20 selects, in accordance with the determined scene, a learning model to be used for object recognition from two or more learning models. Then, the object recognition unit 40 recognizes, using the selected learning model, an object in an image to be photographed during driving of the vehicle. Thus, it is possible to improve the recognition accuracy of an object to be photographed during driving while the calculation load is reduced.

That is, in the present exemplary embodiment, the learning-model selection unit 20 selects a learning model suitable for recognizing an object to be noticed for each scene, and it is possible to improve the object recognition accuracy in accordance with the traveling scene and to reduce the calculation load of the recognition processing.

Second Exemplary Embodiment

Next, an object recognition device in a second exemplary embodiment of the present invention will be described. In the second exemplary embodiment, a method of selecting a learning model in consideration of an external factor affecting an image to be photographed will be described. Specifically, in the second exemplary embodiment, a method of detecting the brightness of the surroundings when an image is photographed to select a learning model will be described.

FIG. 4 is a block diagram showing a configuration example of the object recognition device in the second exemplary embodiment of the present invention. An object recognition device 200 in the present exemplary embodiment includes a scene determination unit 10, a learning-model selection unit 21, an imaging device 30, an object recognition unit 40, an external-factor detection unit 50, an external-factor determination unit 60, and a storage unit 90. The details of the scene determination unit 10, the imaging device 30, the object recognition unit 40, and the storage unit 90 are similar to those in the first exemplary embodiment.

The external-factor detection unit 50 detects an external factor affecting an image to be photographed. In particular, the external-factor detection unit 50 in the present exemplary embodiment detects the brightness affecting an image to be photographed. In the present exemplary embodiment, the external-factor detection unit 50 includes an illuminance sensor 51. The illuminance sensor 51 detects the illuminance of the own vehicle.

The external-factor determination unit 60 determines the degree of the external factor in accordance with the detail detected by the external-factor detection unit 50. The external-factor determination unit 60 in the present exemplary embodiment includes a brightness/darkness determination unit 61. The brightness/darkness determination unit 61 performs brightness/darkness determination based on the illuminance detected by the illuminance sensor 51. The brightness/darkness determination unit 61 may determine that it is bright when the illuminance is greater than a predetermined threshold and that it is dark when the illuminance is lower than the predetermined threshold. In the present exemplary embodiment, the brightness/darkness determination unit 61 determines the determination result as brightness or darkness, but the brightness/darkness determination unit 61 may use the illuminance or a value converted based on the illuminance as the determination result.

The learning-model selection unit 21 selects, in accordance with the determined scene and the external-factor determination result by the external-factor determination unit 60, a learning model to be used for object recognition from two or more learning models. Similarly to the learning-model selection unit 20 in the first exemplary embodiment, by defining in advance a learning model to be selected for each scene and external-factor determination result in accordance with the characteristic of the learning model, the learning-model selection unit 21 in the present exemplary embodiment may select a learning model corresponding to the determined scene and the external-factor determination result.

Figures 5, 6:
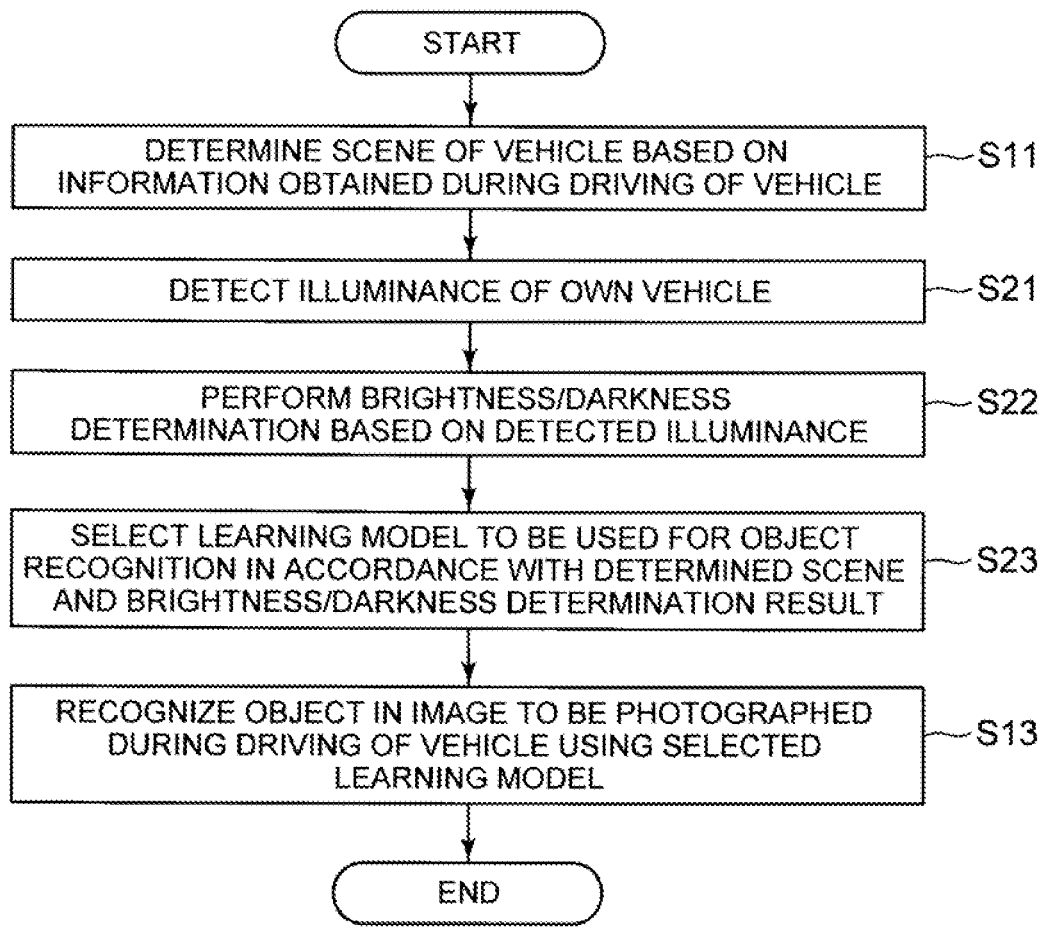
FIG. 5 It depicts an explanatory diagram showing an example of a learning model defined for each scene and external-factor determination result.
FIG. 6 It depicts a flowchart showing an operation example of the object recognition device in the second exemplary embodiment.

FIG. 5 is an explanatory diagram showing an example of a learning model defined for each scene and external-factor determination result. In the example in FIG. 5, the brightness/darkness determination result is added to the definition exemplified in FIG. 2. In the example in FIG. 5, two brightness/darkness determination results are shown, but the brightness/darkness determination results are not limited to two, and a learning model to be selected in accordance with the range of the illuminance may be associated.

The scene determination unit 10, the learning-model selection unit 21, the object recognition unit 40, and the external-factor determination unit 60 (more specifically, the brightness/darkness determination unit 61) are implemented by the CPU of a computer that operates according to a program (object recognition program). In addition, each of the scene determination unit 10, the learning-model selection unit 21, the object recognition unit 40, and the external-factor determination unit 60 (more specifically, the brightness/darkness determination unit 61) may be implemented by dedicated hardware.

Next, the operation of the object recognition device 200 in the present exemplary embodiment will be described. FIG. 6 is a flowchart showing an operation example of the object recognition device 200 in the present exemplary embodiment. The method by which the scene determination unit 10 determines a scene of the vehicle is similar to step S11.

The external-factor detection unit 50 detects an external factor affecting an image to be photographed. In the present exemplary embodiment, the illuminance sensor 51 detects the illuminance of the own vehicle (step S21). The external-factor determination unit 60 determines the degree of the external factor in accordance with the detail detected by the external-factor detection unit 50. In the present exemplary embodiment, the brightness/darkness determination unit 61 performs brightness/darkness determination based on the illuminance detected by the illuminance sensor 51 (step S22).

The learning-model selection unit 21 selects, in accordance with the determined scene and the external-factor determination result by the external-factor determination unit 60, a learning model to be used for object recognition from two or more learning models. In the present exemplary embodiment, the learning-model selection unit 21 selects a learning model in accordance with the determined scene and the brightness/darkness determination result (step S23). Then, the processing of the object recognition unit 40 for recognizing, using the selected learning model, an object in an image to be photographed during driving of the vehicle is similar to step S13.

As described above, in the present exemplary embodiment, the external-factor detection unit 50 detects an external factor affecting an image to be photographed, and the external-factor determination unit 60 determines the degree of the external factor in accordance with the detail detected by the external-factor detection unit 50. Then, the learning-model selection unit 21 selects a learning model in accordance with the determined scene and the external-factor determination result. More specifically, the illuminance sensor 51 detects the illuminance of the own vehicle, the brightness/darkness determination unit 61 performs brightness/darkness determination based on the detected illuminance, and the learning-model selection unit 21 selects a learning model in accordance with the determined scene and the brightness/darkness determination result.

Thus, in addition to the effect of the first exemplary embodiment, it is possible to improve the object recognition accuracy. That is, in the present exemplary embodiment, by considering, for example, the difference in brightness between day and night and the difference in brightness between the inside and the outside of a tunnel, it is possible to improve the object recognition accuracy.

Next, a modified example of the second exemplary embodiment will be described. The second exemplary embodiment has described that the illuminance sensor 51 directly detects the illuminance of the own vehicle and that the brightness/darkness determination unit 61 performs brightness/darkness determination. The external-factor detection unit 50 may not directly detect an external factor, and may indirectly detect an external factor from the operation on the vehicle.

Figure 7:
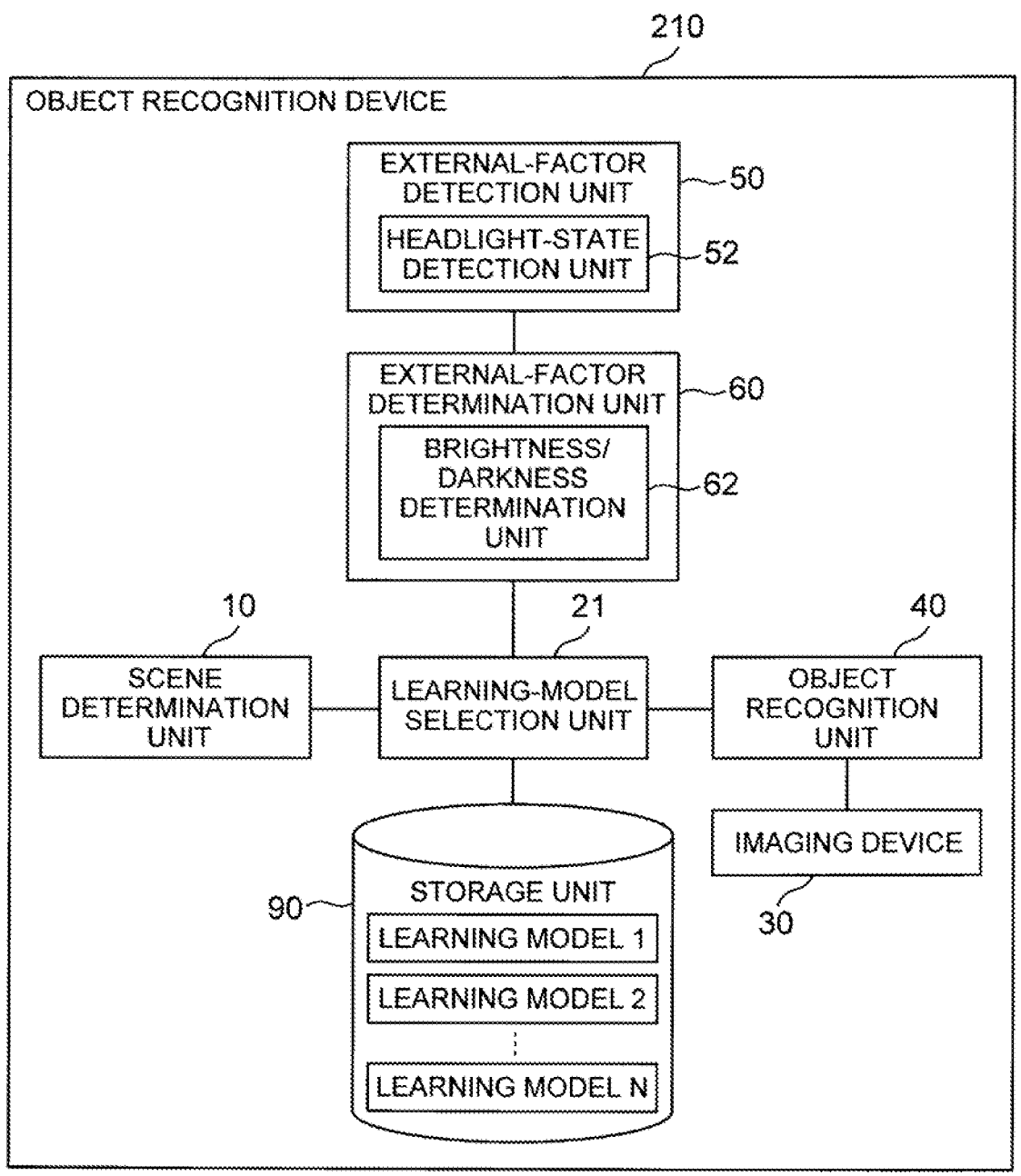
FIG. 7 It depicts a block diagram showing a modified example of the object recognition device in the second exemplary embodiment of the present invention.

FIG. 7 is a block diagram showing a modified example of the object recognition device in the second exemplary embodiment of the present invention. An object recognition device 210 in the modified example includes a headlight-state detection unit 52 and a brightness/darkness determination unit 62 instead of the illuminance sensor 51 and the brightness/darkness determination unit 61 in the second exemplary embodiment. The other configuration is similar to the second exemplary embodiment.

The headlight-state detection unit 52 detects the state of a headlight (on or off, a low beam, a high beam, or the like). The headlight-state detection unit 52 may detect the state of a high beam switch, for example. The brightness/darkness determination unit 62 performs brightness/darkness determination based on the detected state of the headlight. Specifically, the brightness/darkness determination unit 62 determines that it is bright when the headlight is on and that it is dark when the headlight is off. The processing of the learning-model selection unit 21 after the brightness/darkness determination is similar to the second exemplary embodiment. With this configuration, it is also possible to improve the object recognition accuracy similarly to the second exemplary embodiment.

Third Exemplary Embodiment

Next, an object recognition device in a third exemplary embodiment of the present invention will be described. In the third exemplary embodiment, a method of selecting a learning model in consideration of an external factor affecting an image to be photographed will be described. In the third exemplary embodiment, a method of detecting a situation of rainfall when an image is photographed to select a learning model will be described.

Figures 8, 9:
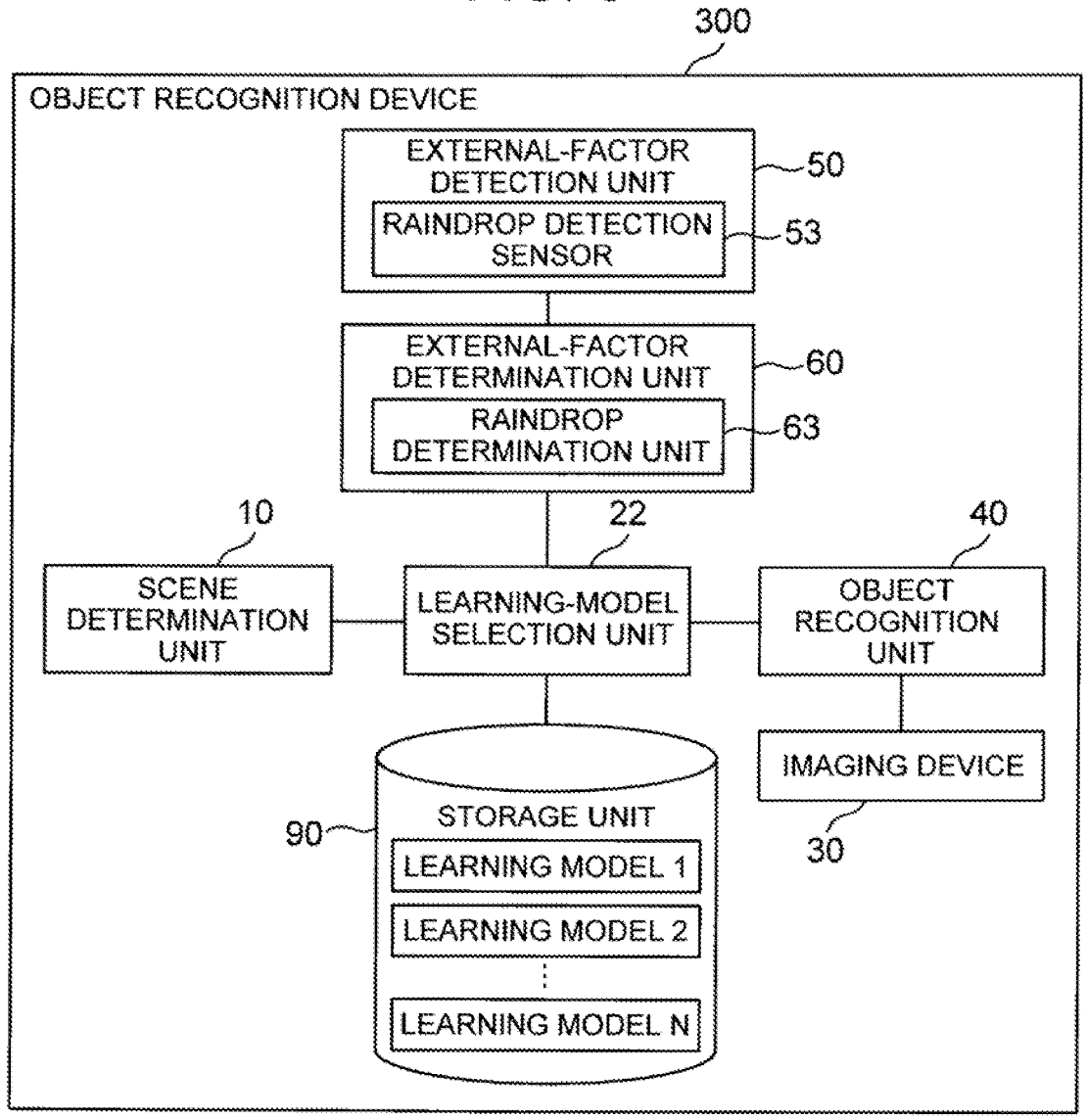
FIG. 8 It depicts a block diagram showing a configuration example of an object recognition device in a third exemplary embodiment of the present invention.
FIG. 9 It depicts an explanatory diagram showing another example of a learning model defined for each scene and external-factor determination result.

FIG. 8 is a block diagram showing a configuration example of the object recognition device in the third exemplary embodiment of the present invention. An object recognition device 300 in the present exemplary embodiment includes a scene determination unit 10, a learning-model selection unit 22, an imaging device 30, an object recognition unit 40, an external-factor detection unit 50, an external-factor determination unit 60, and a storage unit 90. The details of the scene determination unit 10, the imaging device 30, the object recognition unit 40, and the storage unit 90 are similar to those in the first exemplary embodiment.

The external-factor detection unit 50 detects an external factor affecting an image to be photographed similarly to the second exemplary embodiment. In particular, the external-factor detection unit 50 in the present exemplary embodiment detects rainfall affecting an image to be photographed. In the present exemplary embodiment, the external-factor detection unit 50 includes a raindrop detection sensor 53. The raindrop detection sensor 53 detects a raindrop amount on a windshield.

Similarly to the second exemplary embodiment, the external-factor determination unit 60 determines the degree of the external factor in accordance with the detail detected by the external-factor detection unit 50. The external-factor determination unit 60 in the present exemplary embodiment includes a raindrop determination unit 63. The raindrop determination unit 63 performs raindrop determination based on the raindrop amount detected by the raindrop detection sensor 53. The raindrop determination unit 63 may determine that it is "raining" when the raindrop amount is greater than a predetermined threshold and that it is "fine" when the raindrop amount is less than the predetermined threshold. In the present exemplary embodiment, the raindrop determination unit 63 determines the determination result as "raining" or "fine", but the raindrop determination unit 63 may use the raindrop amount or a value converted based on the raindrop amount as the determination result.

Similarly to the second exemplary embodiment, the learning-model selection unit 22 selects, in accordance with the determined scene and the external-factor determination result by the external-factor determination unit 60, a learning model to be used for object recognition from two or more learning models. Similarly to the learning-model selection unit 20 in the first exemplary embodiment, by defining in advance a learning model to be selected for each scene and external-factor determination result in accordance with the characteristic of the learning model, the learning-model selection unit 22 in the present exemplary embodiment may select a learning model corresponding to the determined scene and the external-factor determination result.

FIG. 9 is an explanatory diagram showing another example of a learning model defined for each scene and external-factor determination result. In the example in FIG. 9, the raindrop determination result is added to the definition exemplified in FIG. 2. In the example in FIG. 9, two raindrop determination results are shown, but the raindrop determination results are not limited to two, and a learning model to be selected in accordance with the range of the raindrop amount may be associated.

The scene determination unit 10, the learning-model selection unit 22, the object recognition unit 40, and the external-factor determination unit 60 (more specifically, the raindrop determination unit 63) are implemented by the CPU of a computer that operates according to a program (object recognition program). In addition, each of the scene determination unit 10, the learning-model selection unit 22, the object recognition unit 40, and the external-factor determination unit 60 (more specifically, the raindrop determination unit 63) may be implemented by dedicated hardware.

Figure 10:
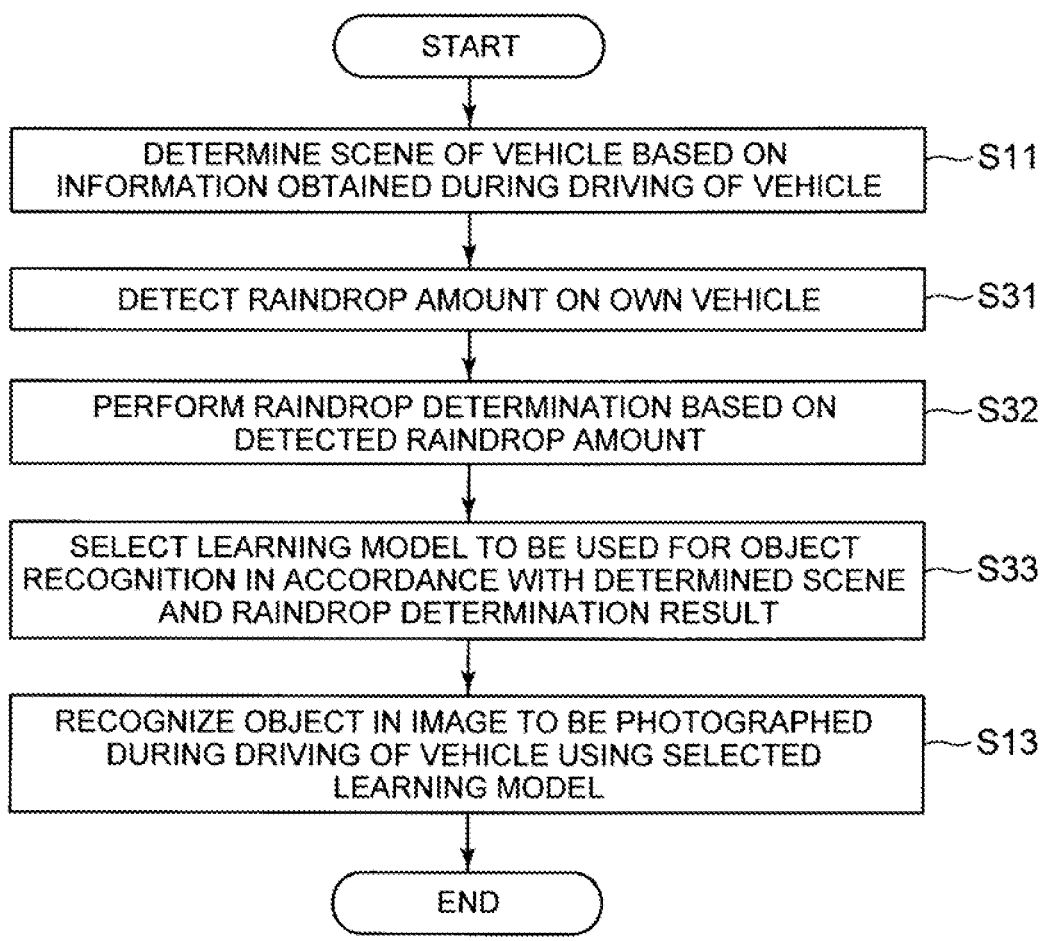
FIG. 10 It depicts a flowchart showing an operation example of the object recognition device in the third exemplary embodiment.

Next, the operation of the object recognition device 300 in the present exemplary embodiment will be described. FIG. 10 is a flowchart showing an operation example of the object recognition device 300 in the present exemplary embodiment. The method by which the scene determination unit 10 determines a scene of the vehicle is similar to step S11.

The external-factor detection unit 50 detects an external factor affecting an image to be photographed. In the present exemplary embodiment, the raindrop detection sensor 53 detects the raindrop amount on the own vehicle (step S31). The external-factor determination unit 60 determines the degree of the external factor in accordance with the detail detected by the external-factor detection unit 50. In the present exemplary embodiment, the raindrop determination unit 63 performs raindrop determination based on the raindrop amount detected by the raindrop detection sensor 53 (step S32).

The learning-model selection unit 22 selects, in accordance with the determined scene and the external-factor determination result by the external-factor determination unit 60, a learning model to be used for object recognition from two or more learning models. In the present exemplary embodiment, the learning-model selection unit 22 selects a learning model in accordance with the determined scene and the raindrop determination result (step S33). Then, the processing of the object recognition unit 40 for recognizing, using the selected learning model, an object in an image to be photographed during driving of the vehicle is similar to step S13.

As described above, in the present exemplary embodiment, the external-factor detection unit 50 detects an external factor affecting an image to be photographed, and the external-factor determination unit 60 determines the degree of the external factor in accordance with the detail detected by the external-factor detection unit 50. Then, the learning-model selection unit 21 selects a learning model in accordance with the determined scene and the external-factor determination result. More specifically, the raindrop detection sensor 53 detects a raindrop amount on the own vehicle, the raindrop determination unit 63 performs raindrop determination based on the detected raindrop amount, and the learning-model selection unit 22 selects a learning model in accordance with the determined scene and the raindrop determination result.

Thus, in addition to the effect of the first exemplary embodiment, it is possible to improve the object recognition accuracy. That is, in the present exemplary embodiment, by considering, for example, the influence of sunny weather and rainy weather, it is possible to improve the object recognition accuracy.

Next, a modified example of the third exemplary embodiment will be described. The third exemplary embodiment has described that the raindrop detection sensor 53 directly detects a raindrop amount on the own vehicle and that the raindrop determination unit 63 performs raindrop determination. The external-factor detection unit 50 may not directly detect an external factor, and may indirectly detect an external factor from the operation on the vehicle.

Figure 11:
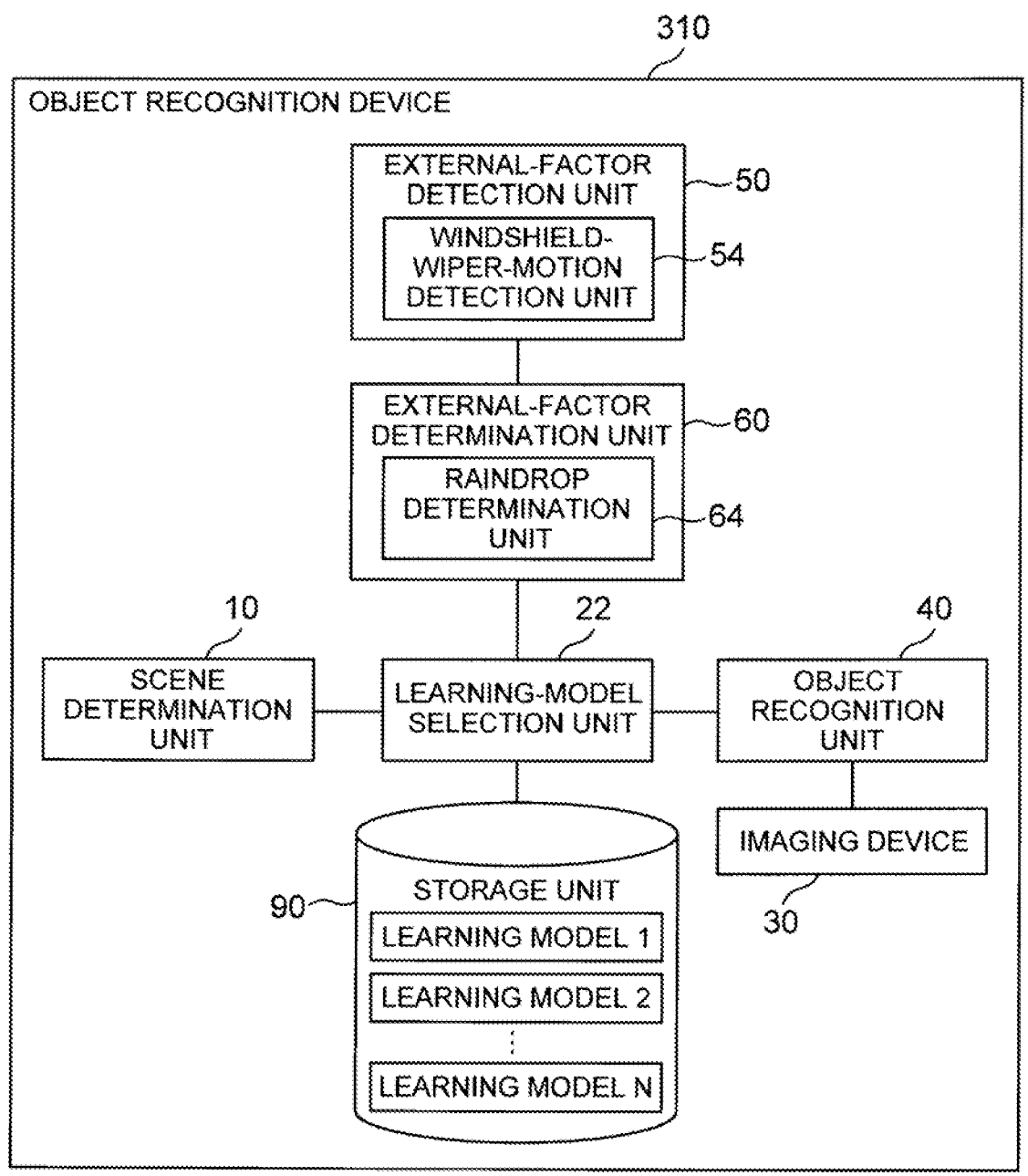
FIG. 11 It depicts a block diagram showing a modified example of the object recognition device in the third exemplary embodiment of the present invention.

FIG. 11 is a block diagram showing a modified example of the object recognition device in the third exemplary embodiment of the present invention. An object recognition device 310 in the present modified example includes a windshield-wiper-motion detection unit 54 and a raindrop determination unit 64 instead of the raindrop detection sensor 53 and the raindrop determination unit 63 in the third exemplary embodiment. The other configuration is similar to the third exemplary embodiment.

The windshield-wiper-motion detection unit 54 detects the operating state (on, off, or an operation interval) of the windshield wiper. The raindrop determination unit 64 performs raindrop determination based on the detected operating state of the windshield wiper. Specifically, the raindrop determination unit 64 determines that it is "fine" when the operating state of the windshield wiper is off and determines, when the operating state of the windshield wiper is on, the raindrop amount in accordance with the operation interval of the windshield wiper. The processing of the learning-model selection unit 22 after the raindrop determination is similar to the third exemplary embodiment. With this configuration, it is also possible to improve the object recognition accuracy similarly to the third exemplary embodiment.

The external-factor detection unit 50 may include at least one of the illuminance sensor 51 and the headlight-state detection unit 52 in the second exemplary embodiment, and at least one of the raindrop detection sensor 53 and the windshield-wiper-motion detection unit 54, and the external-factor determination unit 60 may include corresponding brightness/darkness determination units. Then, a learning model to be selected for each scene and determination result may be defined in advance in accordance with the characteristic of the learning model. With such a configuration, it is possible to select a model considering both illuminance and raindrops.

Fourth Exemplary Embodiment

Figures 12, 13:
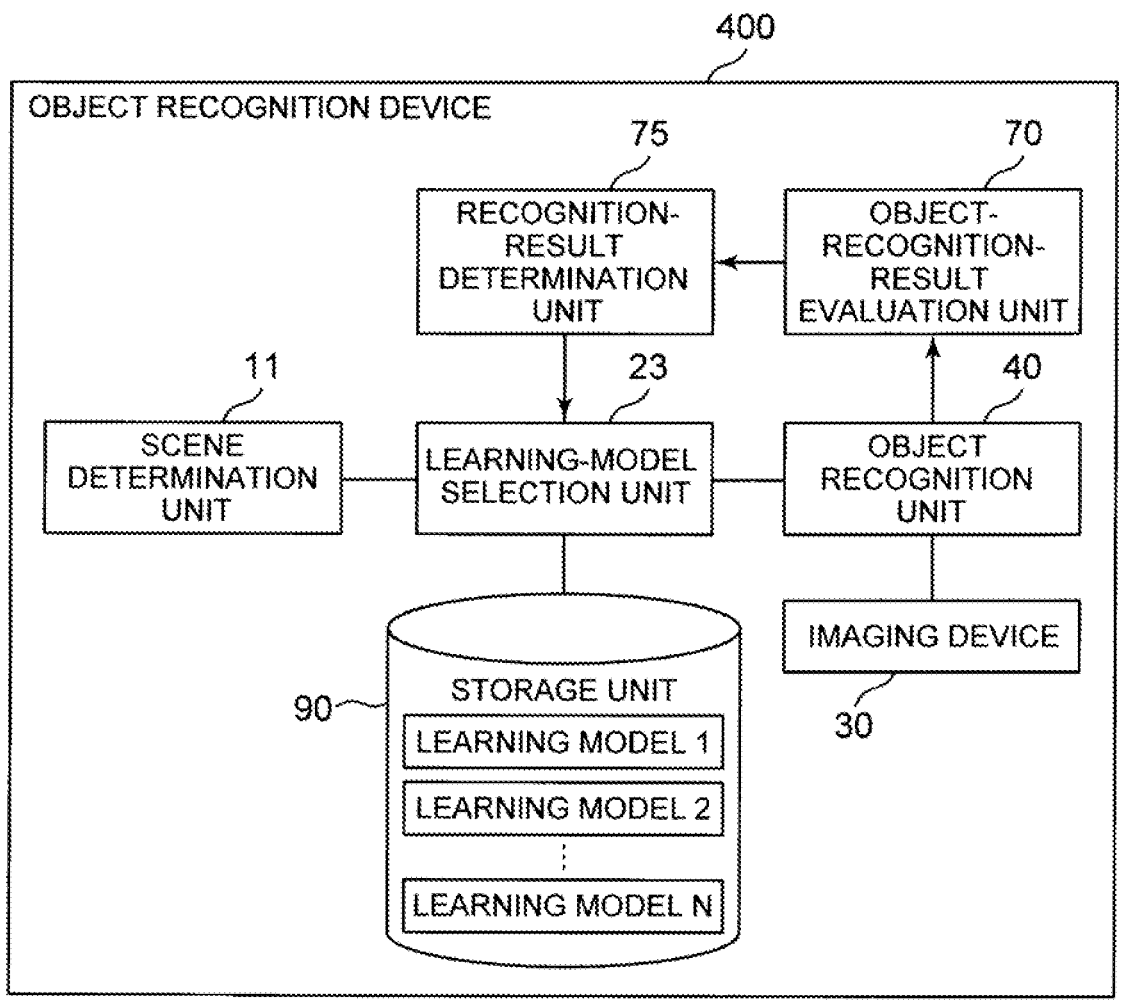
FIG. 12 It depicts a block diagram showing a configuration example of an object recognition device in a fourth exemplary embodiment of the present invention.
FIG. 13 It depicts an explanatory diagram showing an example of a scene determination result.

Next, an object recognition device in a fourth exemplary embodiment of the present invention will be described. In the fourth exemplary embodiment, a method of changing, based on an object recognition result, a learning model to be used for the recognition will be described. FIG. 12 is a block diagram showing a configuration example of the object recognition device in the fourth exemplary embodiment of the present invention. An object recognition device 400 in the present exemplary embodiment includes a scene determination unit 11, a learning-model selection unit 23, an imaging device 30, an object recognition unit 40, an object-recognition-result evaluation unit 70, a recognition-result determination unit 75, and a storage unit 90.

The object recognition device 400 in the present exemplary embodiment may include the external-factor detection unit 50 and the external-factor determination unit 60 in the second exemplary embodiment and the third exemplary embodiment. The details of the imaging device 30, the object recognition unit 40, and the storage unit 90 are similar to those in the first exemplary embodiment. The unidirectional arrows shown in FIG. 12 simply indicate the directions of information flow and do not exclude bidirectionality.

The scene determination unit 11 in the present exemplary embodiment outputs the certainty of each scene (hereinafter, referred to as a score) as a determination result. That is, in the present exemplary embodiment, a scene is not uniquely determined, and information in which a scene and a score are associated is output as a determination result. The scene determination unit 11 may output a score of each scene using, for example, a discrimination model for determining the certainty of each scene.

The scene determination unit 10 in the first to third exemplary embodiments may calculate the certainty of each scene (score) similarly to the scene determination unit 11. In this case, the scene determination unit 10 may use the scene having the highest score as the determination result.

FIG. 13 is an explanatory diagram showing an example of a scene determination result by the scene determination unit 11. In the example shown in FIG. 13, the scores of the scenes "shopping district", "suburban area", and "highway" are 0.9, 0.7, and 0.2, respectively. In addition, the scene determination unit 11 may assign the priority orders to scenes in descending order of score as illustrated in FIG. 13.

When receiving the determination result by the scene determination unit 11, the learning-model selection unit 23 selects a learning model corresponding to the scene having the highest score. The method of selecting a learning model corresponding to a scene is similar to the first exemplary embodiment. In addition, the learning-model selection unit 23 changes the learning model in accordance with a determination result by the recognition-result determination unit 75 described later. The method of changing the learning model will be described later.

The object-recognition-result evaluation unit 70 compares the object recognition result based on the selected learning model with the information indicating the presence/absence of an object to be detected during driving of the vehicle (hereinafter, referred to as object presence/absence information) and evaluates the object recognition result based on the learning model. The information indicating the presence/absence of an object to be detected during driving of the vehicle is, for example, information obtained by the above LiDAR or millimeter-wave radar. The object-recognition-result evaluation unit 70 may determine that the object recognition is matched (the correct answer) when, for example, an object recognized by the object recognition unit 40 is present at the position indicated by the object presence/absence information.

Specifically, the object-recognition-result evaluation unit 70 evaluates the degree of correctness of the object recognition result by the object recognition unit 40 with respect to the object presence/absence information. For example, the object-recognition-result evaluation unit 70 may evaluate, as the degree of correctness, the precision, which is the probability that the correct answer specified from the object presence/absence information is included in the object recognition result. When it is assumed that the precision for a certain image is $p_i$ and that the number of cases of object recognition to be evaluated retroactively is N, the average precision $a_i$ at the time of evaluation is calculated by Expression 1 shown below.

$$a_i = \frac{1}{N}\sum_{k=0}^{N-1} p_{i-k} \qquad (\text{式}1)$$

In Expression 1, N to be evaluated represents the number of elements to be evaluated when the average precision is calculated, and it is also referred to as the number of averaging elements in the following. Alternatively, the object-recognition-result evaluation unit 70 may evaluate the recall indicating the probability of detection among the correct answers as the degree of correctness instead of the precision. Alternatively, the object-recognition-result evaluation unit 70 may evaluate the F value, which is the harmonic mean of the precision and the recall, as the degree of correctness.

The present exemplary embodiment has described the method by which the object-recognition-result evaluation unit 70 evaluates the learning model based on whether the information indicating the presence/absence of an object to be detected during driving of the vehicle (that is, the object presence/absence information) matches the object recognition result.

Meanwhile, if, for example, the LiDAR analyzes the property of the detected object, the object presence/absence information can include information indicating the property of the object. In this case, the object-recognition-result evaluation unit 70 may compare the object recognition result based on the selected learning model with the information representing the property of the object and reflect the certainty of the object in the accuracy rate.

The recognition-result determination unit 75 determines whether the degree of correctness evaluated by the object-recognition-result evaluation unit 70 is less than a predetermined threshold. Hereinafter, the result determined by the recognition-result determination unit 75 is referred to as a recognition determination result. For example, when the object-recognition-result evaluation unit 70 calculates the average precision as the degree of correctness, the recognition-result determination unit 75 determines whether the average precision is less than the threshold and inputs a recognition determination result to the learning-model selection unit 23.

The learning-model selection unit 23 changes the learning model in accordance with the determination result by the recognition-result determination unit 75 (that is, the recognition determination result). Specifically, when the recognition determination result by the recognition-result determination unit 75 is "the degree of correctness is less than the threshold", the learning-model selection unit 23 selects a learning model corresponding to the scene having the highest score next to the current scene. Hereinafter, the recognition processing of the object recognition unit 40 is performed using the newly selected learning model.

The learning-model selection unit 23 may determine whether the score of the reselected learning model is equal to or greater than a predetermined value. If the score of the reselected learning model is less than the predetermined value, the scene determination unit 11 may determine a scene again.

The scene determination unit 11, the learning-model selection unit 23, the object recognition unit 40, the objectrecognition-result evaluation unit 70, and the recognition-result determination unit 75 are implemented by the CPU of a computer that operates according to a program (object recognition program). In addition, each of the scene determination unit 11, the learning-model selection unit 23, the object recognition unit 40, the object-recognition-result evaluation unit 70, and the recognition-result determination unit 75 may be implemented by dedicated hardware.

Figure 14:
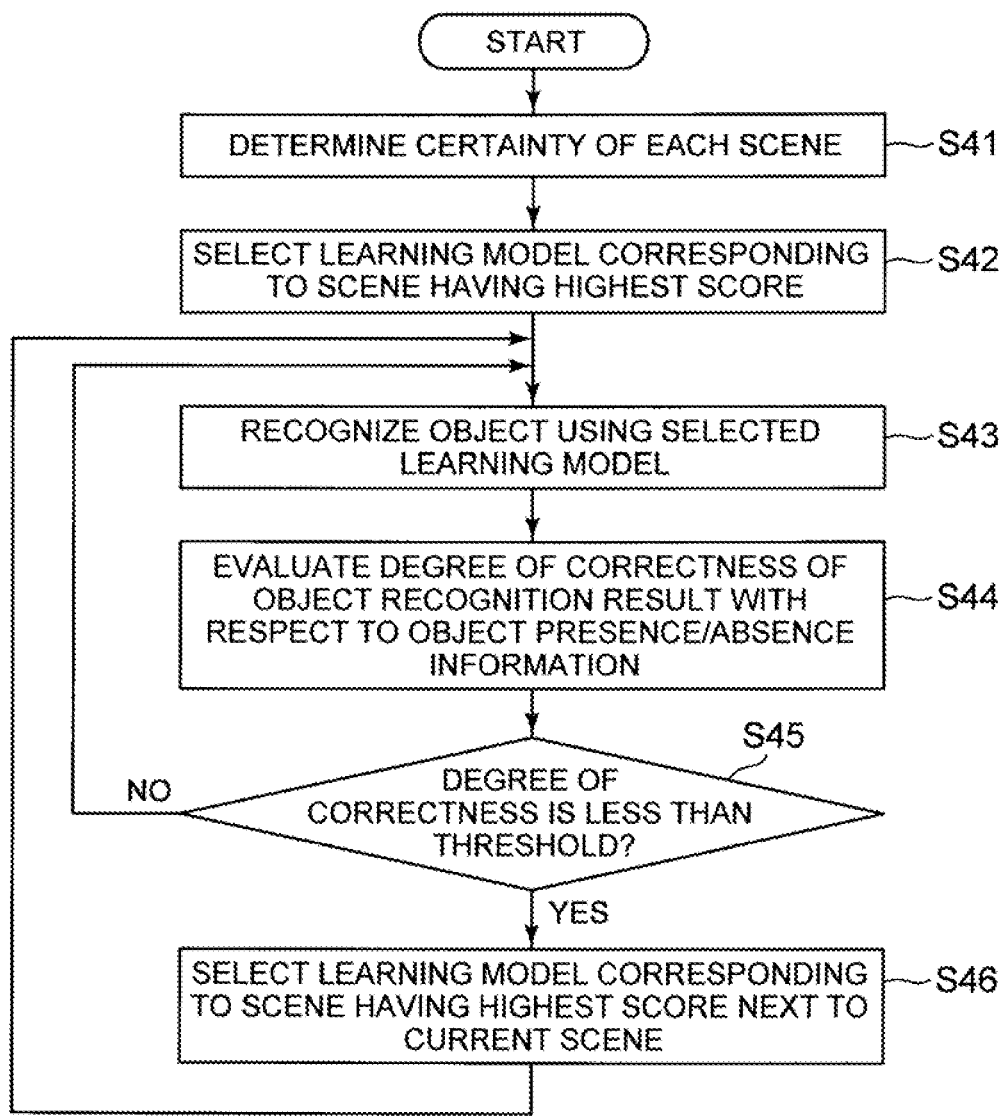
FIG. 14 It depicts a flowchart showing an operation example of the object recognition device in the fourth exemplary embodiment.

Next, the operation of the object recognition device 400 in the present exemplary embodiment will be described. FIG. 14 is a flowchart showing an operation example of the object recognition device 400 in the present exemplary embodiment. First, the scene determination unit 11 determines the certainty of each scene (that is, the score) (step S41), and inputs it to the learning-model selection unit 23. The learning-model selection unit 23 selects a learning model corresponding to the scene having the highest score (step S42). The object recognition unit 40 recognizes an object using the selected learning model (step S43).

The object-recognition-result evaluation unit 70 evaluates the degree of correctness of the object recognition result with respect to the object presence/absence information obtained by the sensors and the like (step S44). The recognition-result determination unit 75 determines whether the degree of correctness is less than a predetermined threshold (step S45). When the degree of correctness is less than the threshold (Yes in step S45), the learning-model selection unit 23 selects a learning model corresponding to the scene having the highest score next to the current scene (step S46). Thereafter, the processing in step S43 and subsequent steps is repeated using the newly selected learning model. On the other hand, when the degree of correctness is equal to or greater than the threshold (No in step S45), the processing in step S43 and subsequent steps is repeated using the current learning model.

As described above, in the present exemplary embodiment, the scene determination unit 11 determines the certainty of each scene (score), the learning-model selection unit 23 selects a learning model corresponding to the scene having the highest score, and the object recognition unit 40 recognizes an object using the selected learning model. Meanwhile, the object-recognition-result evaluation unit 70 evaluates the degree of correctness of the object recognition result with respect to the object presence/absence information, and the recognition-result determination unit 75 determines whether the degree of correctness is less than a predetermined threshold. Then, when the degree of correctness is less than the threshold, the learning-model selection unit 23 selects a learning model corresponding to the scene having the highest score next to the current scene. As described above, by automatically correcting (selecting) a learning model although the optimum learning model is not selected, it is possible to further improve the object recognition accuracy in addition to the effect of the first exemplary embodiment.

Furthermore, the evaluation in the present exemplary embodiment is performed by adjusting the results of the image recognition, which is so-called software-based processing, and the object detection processing, which is hardware-based processing of, for example, a sensor. Thus, the object recognition accuracy is improved by making the most of each processing.

Fifth Exemplary Embodiment

Next, an object recognition device in a fifth exemplary embodiment of the present invention will be described. As a vehicle travels, a scene to be subjected to object recognition keeps changing. Since a scene to be subjected to object recognition is considered to change in accordance with the traveling speed of the vehicle, the object recognition is required to be performed in consideration of the traveling speed of the vehicle. For this reason, in the fifth exemplary embodiment, a method of determining the appropriateness of a learning model in accordance with the traveling speed of the vehicle will be described.

Figure 15:
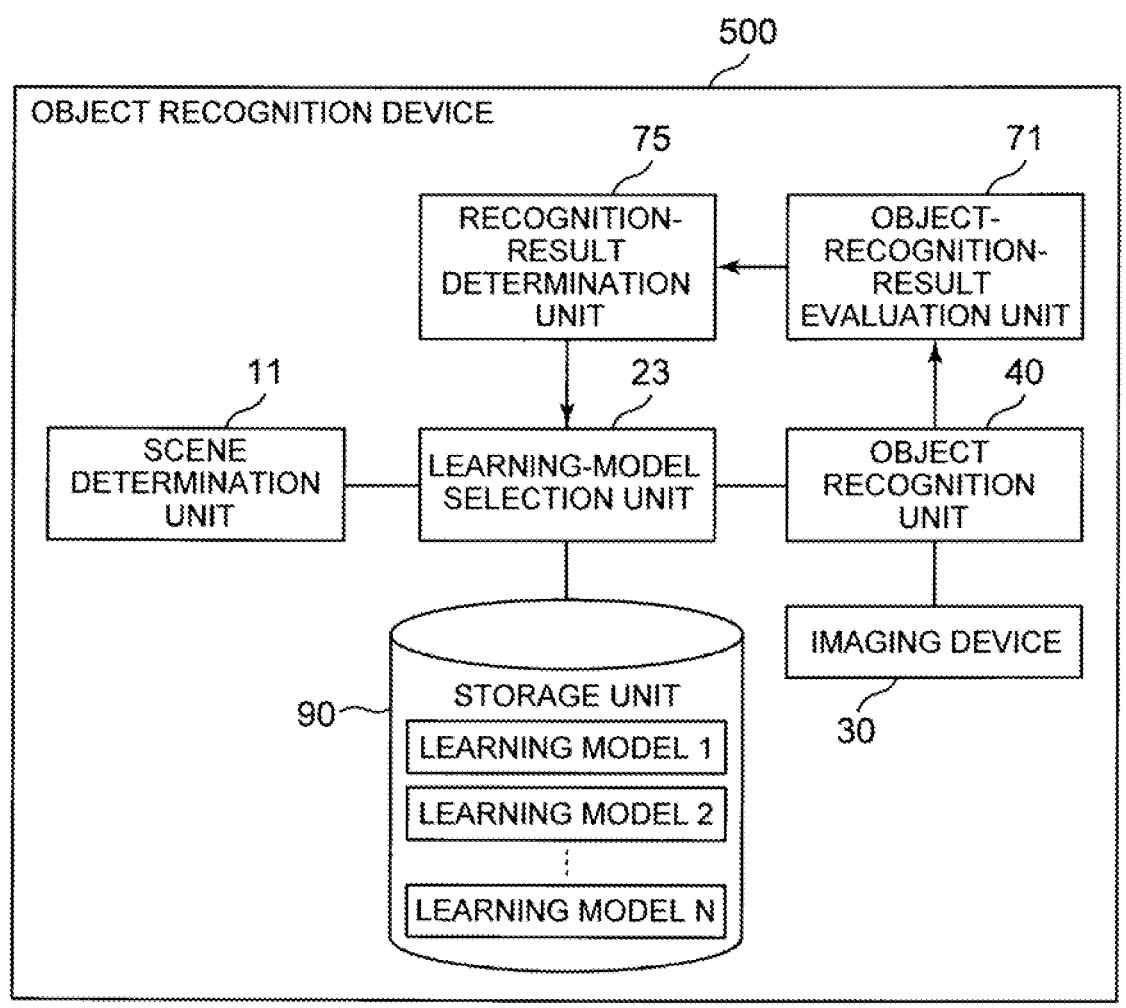
FIG. 15 It depicts a block diagram showing a configuration example of an object recognition device in a fifth exemplary embodiment of the present invention.

FIG. 15 is a block diagram showing a configuration example of the object recognition device in the fifth exemplary embodiment of the present invention. An object recognition device 500 in the present exemplary embodiment includes a scene determination unit 11, a learning-model selection unit 23, an imaging device 30, an object recognition unit 40, an object-recognition-result evaluation unit 71, a recognition-result determination unit 75, and a storage unit 90. That is, the object recognition device 500 in the present exemplary embodiment is different from the object recognition device 400 in the fourth exemplary embodiment in that the object-recognition-result evaluation unit 71 is provided instead of the object-recognition-result evaluation unit 70. The other configuration is similar to the fourth exemplary embodiment.

The object-recognition-result evaluation unit 71 acquires the speed of the vehicle. The object-recognition-result evaluation unit 71 may acquire the speed of the vehicle using a protocol such as a controller area network (CAN). Then, the object-recognition-result evaluation unit 71 evaluates, similarly to the fourth exemplary embodiment, the degree of correctness of the object recognition result with respect to the object presence/absence information obtained by the sensor and the like. At that time, the object-recognition-result evaluation unit 71 changes the evaluation range of the object recognition in accordance with the acquired speed of the vehicle. Specifically, the object-recognition-result evaluation unit 71 narrows the evaluation range of the object recognition as the speed of the vehicle is increased, and widens the evaluation range of the object recognition as the speed of the vehicle is decreased.

For example, the object-recognition-result evaluation unit 71 is assumed to calculate the average precision as the degree of correctness. In this case, the evaluation range corresponds to the number of averaging elements N, and the object-recognition-result evaluation unit 71 may reduce the number of averaging elements N as the speed of the vehicle is increased, and increase the number of averaging elements N as the speed of the vehicle is decreased (or stopped).

The scene determination unit 11, the learning-model selection unit 23, the object recognition unit 40, the object-recognition-result evaluation unit 71, and the recognition-result determination unit 75 are implemented by the CPU of a computer that operates according to a program (object recognition program). In addition, each of the scene determination unit 11, the learning-model selection unit 23, the object recognition unit 40, the object-recognition-result evaluation unit 71, and the recognition-result determination unit 75 may be implemented by dedicated hardware.

Figure 16:
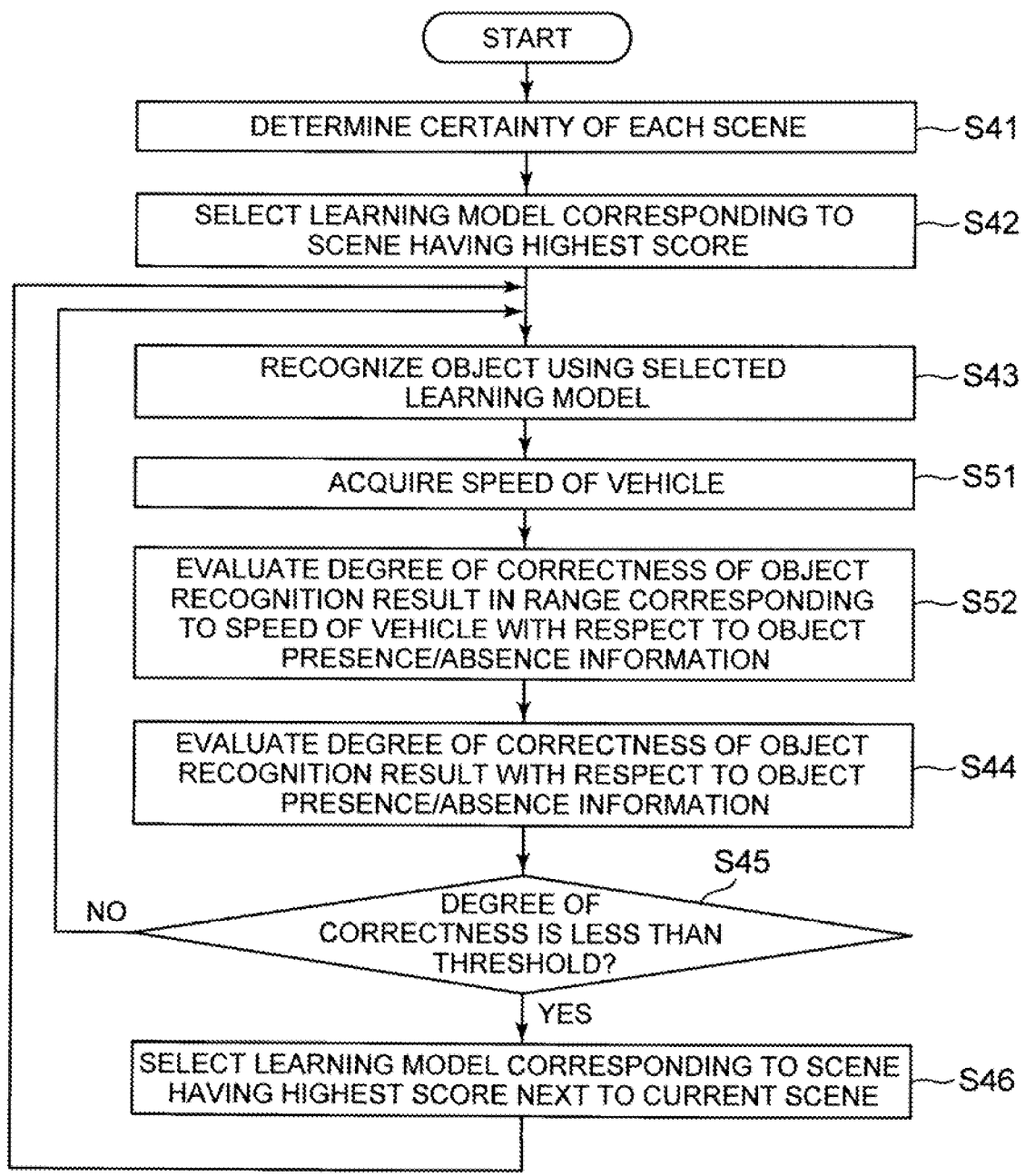
FIG. 16 It depicts a flowchart showing an operation example of the object recognition device in the fifth exemplary embodiment.

Next, the operation of the object recognition device 500 in the present exemplary embodiment will be described. FIG. 16 is a flowchart showing an operation example of the object recognition device 500 in the present exemplary embodiment. The processing for recognizing an object using a learning model selected based on the calculated score is similar to the processing in steps S41 to S43 in the fourth exemplary embodiment.

The object-recognition-result evaluation unit 71 acquires the speed of the vehicle (step S51). The object-recognition-result evaluation unit 71 evaluates, similarly to the fourth exemplary embodiment, the degree of correctness of the object recognition result with respect to the object presence/absence information obtained by the sensors and the like. At that time, the object-recognition-result evaluation unit 71 changes the evaluation range of the object recognition in accordance with the acquired speed of the vehicle. That is, the object-recognition-result evaluation unit 71 evaluates the degree of correctness of the object recognition result in the range corresponding to the speed of the vehicle with respect to the object presence/absence information (step S52). Thereafter, the processing for selecting a learning model in accordance with the degree of correctness is similar to the processing in steps S44 to S46 in the fourth exemplary embodiment.

As described above, in the present exemplary embodiment, the object-recognition-result evaluation unit 71 evaluates the degree of correctness of the object recognition result in the range corresponding to the speed of the vehicle with respect to the object presence/absence information. In this manner, it is possible to optimize the reselection period of a learning model in accordance with the speed of the vehicle and to further improve the object recognition accuracy in addition to the effect of the fourth exemplary embodiment.

Figure 17:
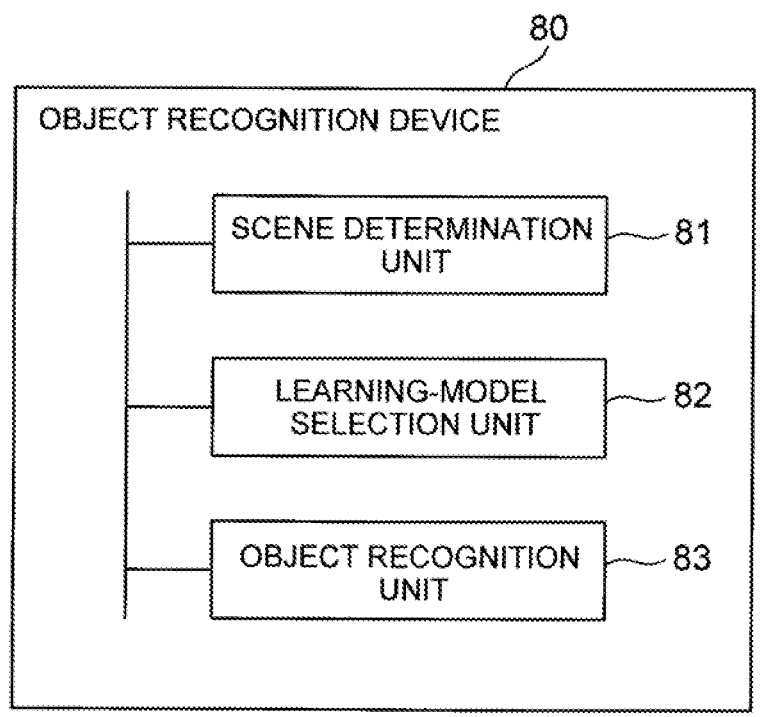
FIG. 17 It depicts a block diagram illustrating an outline of an object recognition device according to the present invention.

Next, an outline of the present invention will be described. FIG. 17 is a block diagram illustrating an outline of an object recognition device according to the present invention. An object recognition device 80 (for example, the object recognition devices 100 to 500) according to the present invention includes a scene determination unit 81 (for example, the scene determination units 10 and 11) that determines, based on information acquired during driving of a vehicle (for example, position information, millimeter wave information, LiDAR information, camera information, or the like), a scene of the vehicle, a learning-model selection unit 82 (for example, the learning-model selection units 20 to 23) that selects a learning model to be used for object recognition from two or more learning models in accordance with the determined scene, and an object recognition unit 83 (for example, the object recognition unit 40) that recognizes an object in an image to be photographed during driving of the vehicle using the selected learning model.

With this configuration, it is possible to improve the recognition accuracy of an object to be photographed during driving while the calculation load is reduced.

In addition, the object recognition device 80 may include an external-factor detection unit (for example, the external-factor detection unit 50) that detects an external factor affecting an image to be photographed, and an external-factor determination unit (for example, the external-factor determination unit 60) that determines the degree of the external factor in accordance with the detected detail. Then, the learning-model selection unit 82 may select a learning model in accordance with the determined scene and the external-factor determination result. With this configuration, it is possible to select a learning model in accordance with the influence of the external factor, and to further improve the object recognition accuracy.

Specifically, the external-factor detection unit (for example, the illuminance sensor 51 and the headlight-state detection unit 52) may detect the brightness affecting an image to be photographed. In addition, the external-factor determination unit (for example, the brightness/darkness determination units 61 and 62) may perform brightness determination based on the detected brightness. Then, the learning-model selection unit 82 may select a learning model in accordance with the determined scene and the result of the brightness determination.

In addition, the external-factor detection unit (for example, the raindrop detection sensor 53 and the windshield-wiper-motion detection unit 54) may detect rainfall affecting an image to be photographed. Furthermore, the external-factor determination unit (for example, the raindrop determination units 63 and 64) may perform raindrop determination based on the detected rainfall. Then, the learning-model selection unit 82 may select a learning model in accordance with the determined scene and the result of the raindrop determination.

In addition, the object recognition device 80 may include an object-recognition-result evaluation unit (for example, the object-recognition-result evaluation unit 70) that compares an object recognition result based on the selected learning model with object presence/absence information indicating whether an object to be detected during driving of the vehicle is present or not to evaluate the object recognition result based on the selected learning model and a recognition-result determination unit (for example, the recognition-result determination unit 75) that determines the evaluation of the object recognition result.

At this time, the scene determination unit 81 may determine a score which is the certainty of each scene, the learning-model selection unit 82 may select a learning model corresponding to the scene having the highest score, and the object recognition unit 83 may recognize the object using the selected learning model. In addition, the object-recognition-result evaluation unit may evaluate the degree of correctness of the object recognition result with respect to the object presence/absence information, the recognition-result determination unit may determine whether the degree of correctness is less than a predetermined threshold, and the learning-model selection unit 82 may select, when the degree of correctness is less than the threshold, a learning model corresponding to a scene with the highest score next to the current scene.

At that time, the object-recognition-result evaluation unit may acquire the speed of the vehicle to change the evaluation range of the object recognition in accordance with the acquired speed of the vehicle. With this configuration, it is possible to optimize the reselection period of a learning model in accordance with the speed of the vehicle and to further improve the object recognition accuracy.

Specifically, the object-recognition-result evaluation unit may narrow the evaluation range of the object recognition as the speed of the vehicle is increased, and widens the evaluation range of the object recognition as the speed of the vehicle is decreased.

In addition, the object-recognition-result evaluation unit may calculate a precision (for example, $p_i$), which is the probability that the correct answer based on the object recognition is included in a detection result specified from the object presence/absence information by the number of averaging elements (for example, N), which is the number of cases of object recognition to be evaluated, to calculate an average precision (for example, $a_i$), which is the average of calculated precisions, and the recognition-result determination unit may determine whether the calculated average precision is less than a predetermined threshold.

Note that, a part or all of the above exemplary embodiments can also be described as follows, but are not limited to the following.

(Supplementary note 1) An object recognition device comprising: a scene determination unit configured to determine, based on information obtained during driving of a vehicle, a scene of the vehicle; a learning-model selection unit configured to select, in accordance with the determined scene, a learning model to be used for object recognition from two or more learning models; and an object recognition unit configured to recognize, using the selected learning model, an object in an image to be photographed during driving of the vehicle.

(Supplementary note 2) The object recognition device according to supplementary note 1 further comprising: an external-factor detection unit configured to detect an external factor affecting an image to be photographed; and an external-factor determination unit configured to determine, in accordance with the detected external factor, the degree of the external factor, wherein the learning-model selection unit is configured to select a learning model in accordance with the determined scene and a result of the determination of the external factor.

(Supplementary note 3) The object recognition device according to supplementary note 2, wherein the external-factor detection unit is configured to detect brightness affecting an image to be photographed, the external-factor determination unit is configured to perform brightness/darkness determination based on the detected brightness, and the learning-model selection unit is configured to select a learning model in accordance with the determined scene and a result of the brightness/darkness determination.

(Supplementary note 4) The object recognition device according to supplementary note 3, wherein the external-factor detection unit includes an illuminance sensor configured to detect illuminance of the vehicle, the external-factor determination unit includes a brightness/darkness determination unit configured to perform brightness/darkness determination based on the illuminance detected by the illuminance sensor, and the learning-model selection unit is configured to select a learning model in accordance with the determined scene and a result of the brightness/darkness determination.

(Supplementary note 5) The object recognition device according to supplementary note 3, wherein the external-factor detection unit includes a headlight-state detection unit configured to detect a state of a headlight, the external-factor determination unit includes a brightness/darkness determination unit configured to perform brightness/darkness determination based on the detected state of the headlight, and the learning-model selection unit is configured to select a learning model in accordance with the determined scene and a result of the brightness/darkness determination.

(Supplementary note 6) The object recognition device according to supplementary note 2, wherein the external-factor detection unit is configured to detect rainfall affecting an image to be photographed, the external-factor determination unit is configured to perform raindrop determination based on the detected rainfall, and the learning-model selection unit is configured to select a learning model in accordance with the determined scene and a result of the raindrop determination.

(Supplementary note 7) The object recognition device according to any one of Supplementary notes 2 to 6, wherein the external-factor detection unit includes a raindrop detection sensor configured to detect a raindrop amount on a windshield, the external-factor determination unit includes a raindrop determination unit configured to perform raindrop determination based on the raindrop amount detected by the raindrop detection sensor, and the learning-model selection unit is configured to select a learning model in accordance with the determined scene and a result of the raindrop determination.

(Supplementary note 8) The object recognition device according to any one of Supplementary notes 2 to 6, wherein the external-factor detection unit includes a windshield-wiper-motion detection sensor configured to detect an operating state of a windshield wiper, the external-factor determination unit includes a raindrop determination unit configured to perform raindrop determination based on the detected operating state of the windshield wiper, and the learning-model selection unit is configured to select a learning model in accordance with the determined scene and a result of the raindrop determination.

(Supplementary note 9) The object recognition device according to any one of Supplementary notes 1 to 8 further comprising: an object-recognition-result evaluation unit configured to compare an object recognition result based on the selected learning model with object presence/absence information indicating whether an object to be detected during driving of the vehicle is present or not to evaluate the object recognition result based on the selected learning model; and a recognition-result determination unit configured to determine the evaluation of the object recognition result, wherein the scene determination unit is configured to determine a score indicating a certainty of each scene, the learning-model selection unit is configured to select a learning model corresponding to a scene having a highest score, the object recognition unit is configured to recognize the object using the selected learning model, the object-recognition-result evaluation unit is configured to evaluate the degree of correctness of the object recognition result with respect to the object presence/absence information, the recognition-result determination unit is configured to determine whether the degree of correctness is less than a predetermined threshold, and the learning-model selection unit is configured to select, when the degree of correctness is less than the threshold, a learning model corresponding to a scene having a highest score next to the current scene.

(Supplementary note 10) The object recognition device according to supplementary note 9, wherein the object-recognition-result evaluation unit is configured to acquire a speed of the vehicle to change an evaluation range of the object recognition in accordance with the acquired speed of the vehicle.

(Supplementary note 11) The object recognition device according to supplementary note 10, wherein the object-recognition-result evaluation unit is configured to narrow the evaluation range of the object recognition as the speed of the vehicle is increased, and to widen the evaluation range of the object recognition as the speed of the vehicle is decreased.

(Supplementary note 12) The object recognition device according to any one of Supplementary notes 9 to 11, wherein the object-recognition-result evaluation unit is configured to calculate a precision, the precision being a probability that a correct answer based on the object recognition is included in a detection result specified from the object presence/absence information, by the number of averaging elements, the number of averaging elements being the number of cases of object recognition to be evaluated, to calculate an average precision, the average precision being the average of calculated precisions, and the recognition-result determination unit is configured to determine whether the calculated average precision is less than a predetermined threshold.

(Supplementary note 13) The object recognition device according to any one of Supplementary notes 1 to 12, wherein the scene determination unit is configured to determine a scene of the vehicle using a distinction model for distinguishing a certainty of each scene.

(Supplementary note 14) An object recognition method comprising: determining, by a computer, a scene of a vehicle based on information obtained during driving of the vehicle; selecting, by the computer, a learning model to be used for object recognition from two or more learning models in accordance with the determined scene; and recognizing, by the computer, an object in an image to be photographed during driving of the vehicle using the selected learning model.

(Supplementary note 15) The object recognition method according to supplementary note 14 further comprising: detecting, by the computer, an external factor affecting an image to be photographed; determining, by the computer, the degree of the external factor in accordance with the detected external factor; and selecting, by the computer, a learning model in accordance with the determined scene and a result of the determination of the external factor.

(Supplementary note 16) An object recognition program causing a computer to execute: scene determination processing for determining a scene of a vehicle based on information obtained during driving of the vehicle; learning model selection processing for selecting a learning model to be used for object recognition from two or more learning models in accordance with the determined scene; and object recognition processing for recognizing an object in an image to be photographed during driving of the vehicle using the selected learning model.

(Supplementary note 17) The object recognition program according to supplementary note 16, the program further causing the computer to execute: external factor detection processing for detecting an external factor affecting an image to be photographed; and external factor determination processing for determining the degree of the external factor in accordance with the detected external factor, wherein the learning model selection processing includes selecting a learning model in accordance with the determined scene and a result of the determination of the external factor.

The present invention has been described with reference to the exemplary embodiments and examples, but is not limited to the above exemplary embodiments and examples. Various changes that can be understood by those skilled in the art within the scope of the present invention can be made to the configurations and details of the present invention.

This application claims priority based on Japanese Patent Application No. 2018-203943 filed on Oct. 30, 2018, the disclosure of which is incorporated herein in its entirety.

REFERENCE SIGNS LIST 10, 11 Scene determination unit
20, 21, 22, 23 Learning-model selection unit
30 Imaging device
40 Object recognition unit
50 External-factor detection unit
51 Illuminance sensor
52 Headlight-state detection unit
53 Raindrop detection sensor
54 Windshield-wiper-motion detection unit
60 External-factor determination unit
61, 62 Brightness/darkness determination unit
63, 64 Raindrop determination unit
70, 71 Object-recognition-result evaluation unit
75 Recognition-result determination unit
90 Storage unit
100, 200, 210, 300, 310, 400, 500 Object recognition device

What is claimed is:

1. An object recognition device comprising a hardware processor configured to execute a software code to:
   determine, based on information obtained during driving of a vehicle, a scene of the vehicle;
   select, in accordance with the determined scene, a learning model to be used for object recognition from two or more learning models; and
   recognize, using the selected learning model, an object in an image to be photographed during driving of the vehicle,
wherein the hardware processor is further configured to execute the software code to:
   determine a score indicating a certainty of each scene;
   select a learning model corresponding to a scene having a highest score;
   recognize the object using the selected learning model;
   compare an object recognition result based on the selected learning model with object presence/absence information indicating whether an object to be detected during driving of the vehicle is present or not;
   evaluate the degree of correctness of the object recognition result with respect to the object presence/absence information,
   determine whether the degree of correctness is less than a predetermined threshold; and
   select, when the degree of correctness is less than the threshold, a learning model corresponding to a scene having a highest score next to the current scene.

2. The object recognition device according to claim 1, wherein the hardware processor is configured to execute a software code to:
   detect an external factor affecting an image to be photographed;
determine, in accordance with the detected external factor, the degree of the external factor; and
   select a learning model in accordance with the determined scene and a result of the determination of the external factor.

3. The object recognition device according to claim 2, wherein the hardware processor is configured to execute a software code to:
   detect brightness affecting an image to photographed;
   perform brightness/darkness determination based on the detected brightness; and
   select a learning model in accordance with the determined scene and a result of the brightness/darkness determination.

4. The object recognition device according to claim 3, wherein the hardware processor is configured to execute a software code to:
   perform brightness/darkness determination based on illuminance detected by an illuminance sensor to detect illuminance of the vehicle; and
select a learning model in accordance with the determined scene and a result of the brightness/darkness determination.

5. The object recognition device according to claim 3, wherein the hardware processor is configured to execute a software code to:
   detect a state of a headlight;
   perform brightness/darkness determination based on the detected state of the headlight; and
   select a learning model in accordance with the determined scene and a result of the brightness/darkness determination.

6. The object recognition device according to claim 2, wherein the hardware processor is configured to execute a software code to:
　　detect rainfall affecting an image to be photographed;
　　perform raindrop determination based on the detected rainfall; and
　　select a learning model in accordance with the determined scene and a result of the raindrop determination.

7. The object recognition device according to claim 2, wherein the hardware processor is configured to execute a software code to:
　　perform raindrop determination based on a raindrop amount detected by a raindrop detection sensor to detect a raindrop amount on a windshield; and
　　select a learning model in accordance with the determined scene and a result of the raindrop determination.

8. The object recognition device according to claim 2, wherein the hardware processor is configured to execute a software code to:
　　detect an operating state of a windshield wiper;
　　perform raindrop determination based on the detected operating state of the windshield wiper; and
　　select a learning model in accordance with the determined scene and a result of the raindrop determination.

9. The object recognition device according to claim 1, wherein the hardware processor is configured to execute a software code to
　　acquire a speed of the vehicle to change an evaluation range of the object recognition in accordance with the acquired speed of the vehicle.

10. The object recognition device according to claim 9, wherein the hardware processor is configured to execute a software code to
　　narrow the evaluation range of the object recognition as the speed of the vehicle is increased, and to widen the evaluation range of the object recognition as the speed of the vehicle is decreased.

11. The object recognition device according to claim 1, wherein the hardware processor is configured to execute a software code to:
　　calculate a precision, the precision being a probability that a correct answer based on the object recognition is included in a detection result specified from the object presence/absence information, by the number of averaging elements, the number of averaging elements being the number of cases of object recognition to be evaluated;
　　calculate an average precision, the average precision being the average of calculated precisions; and
　　determine whether the calculated average precision is less than a predetermined threshold.

12. The object recognition device according to claim 1, wherein the hardware processor is configured to execute a software code to
　　determine a scene of the vehicle using a distinction model for distinguishing a certainty of each scene.

13. An object recognition method comprising:
　　determining, by a computer, a scene of a vehicle based on information obtained during driving of the vehicle;
　　selecting, by the computer, a learning model to be used for object recognition from two or more learning models in accordance with the determined scene; and
　　recognizing, by the computer, an object in an image to be photographed during driving of the vehicle using the selected learning model,
　　determining a score indicating a certainty of each scene;
　　selecting a learning model corresponding to a scene having a highest score;
　　recognizing the object using the selected learning model;
　　comparing an object recognition result based on the selected learning model with object presence/absence information indicating whether an object to be detected during driving of the vehicle is present or not;
　　evaluating the degree of correctness of the object recognition result with respect to the object presence/absence information,
　　determining whether the degree of correctness is less than a predetermined threshold; and
　　selecting, when the degree of correctness is less than the threshold, a learning model corresponding to a scene having a highest score next to the current scene.

14. The object recognition method according to claim 13 further comprising:
　　detecting, by the computer, an external factor affecting an image to be photographed;
　　determining, by the computer, the degree of the external factor in accordance with the detected external factor; and
　　selecting, by the computer, a learning model in accordance with the determined scene and a result of the determination of the external factor.

15. A non-transitory computer readable information recording medium storing an object recognition program, when executed by a processor, that performs a method for:
　　determining a scene of a vehicle based on information obtained during driving of the vehicle;
　　selecting a learning model to be used for object recognition from two or more learning models in accordance with the determined scene; and
　　recognizing an object in an image to be photographed during driving of the vehicle using the selected learning model,
wherein the method further comprises:
　　determining a score indicating a certainty of each scene;
　　selecting a learning model corresponding to a scene having a highest score;
　　recognizing the object using the selected learning model;
　　comparing an object recognition result based on the selected learning model with object presence/absence information indicating whether an object to be detected during driving of the vehicle is present or not;
　　evaluating the degree of correctness of the object recognition result with respect to the object presence/absence information,
　　determining whether the degree of correctness is less than a predetermined threshold; and
　　select, when the degree of correctness is less than the threshold, a learning model corresponding to a scene having a highest score next to the current scene.

16. The non-transitory computer readable information recording medium according to claim 15, further comprising:
　　detecting an external factor affecting an image to be photographed;
　　determining the degree of the external factor in accordance with the detected external factor and
　　selecting a learning model in accordance with the determined scene and a result of the determination of the external factor.

\* \* \* \* \*